(12) United States Patent
Kondou

(10) Patent No.: US 10,739,168 B2
(45) Date of Patent: Aug. 11, 2020

(54) ABSOLUTE ENCODER COMPRISING A CLOCK CONTROL CIRCUIT TO CHANGE THE PULSE WIDTH OF EACH BACKUP CLOCK PULSE

(71) Applicant: FANUC CORPORATION, Yamanashi (JP)

(72) Inventor: Youhei Kondou, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/396,991

(22) Filed: Apr. 29, 2019

(65) Prior Publication Data

US 2019/0339097 A1    Nov. 7, 2019

(30) Foreign Application Priority Data

May 1, 2018    (JP) .................. 2018-088069

(51) Int. Cl.
 *G01D 3/08*       (2006.01)
 *G01D 5/245*      (2006.01)
 *G01D 5/347*      (2006.01)
 *G01D 5/244*      (2006.01)

(52) U.S. Cl.
 CPC ....... *G01D 5/2454* (2013.01); *G01D 5/24476* (2013.01); *G01D 5/347* (2013.01)

(58) Field of Classification Search
 CPC ............ G01D 5/2497; G01D 5/24476; G01D 5/2454; G01D 5/347; G01D 3/08; H03M 1/143; G05B 2219/37104; G01F 1/30
 USPC ........................................ 250/231.13, 214 R
 See application file for complete search history.

(56) References Cited

U.S. PATENT DOCUMENTS 4,922,176 A * 5/1990 Kim .................. G05B 19/21
                                                250/231.16

FOREIGN PATENT DOCUMENTS

| JP | 2005012921 A | 1/2005 |
|----|--------------|--------|
| JP | 2008224283 A | 9/2008 |
| JP | 2013007696 A | 1/2013 |
| JP | 2015056692 A | 3/2015 |

OTHER PUBLICATIONS

Decision to Grant a Patent issued by the Japanese Patent Office in relation to Japanese Application No. 2018-088069 dated Jan. 21, 2020 (3 pages) along with English language translation (2 pages).

* cited by examiner

*Primary Examiner* — Que Tan Le
(74) *Attorney, Agent, or Firm* — Robert P. Michal, Esq.; Carter, DeLuca & Farrell LLP

(57) ABSTRACT

An absolute encoder is driven by backup power from an external battery for backup. The absolute encoder includes: a clock generator configured to generate backup clock pulses at intervals of a predetermined period when the backup power is supplied; an analog signal generation circuit configured to operate according to the clock pulse so as to detect a displacement position of a motor and generate an analog signal corresponding to the detected displacement position; a comparator configured to operate according to the clock pulse so as to compare the analog signal with a predetermined voltage; and a clock control circuit configured to control the clock generator to change the pulse width of the clock pulse.

7 Claims, 5 Drawing Sheets

ABSOLUTE ENCODER COMPRISING A CLOCK CONTROL CIRCUIT TO CHANGE THE PULSE WIDTH OF EACH BACKUP CLOCK PULSE

CROSS-REFERENCE TO RELATED APPLICATION

This application is based upon and claims the benefit of priority from Japanese Patent Application No. 2018-088069 filed on May 1, 2018, the contents of which are incorporated herein by reference.

BACKGROUND OF THE INVENTION

Field of the Invention

The present invention relates to an absolute encoder that measures the displacement position of a motor.

Description of the Related Art

Japanese Laid-Open Patent Publication 2013-007696 discloses an encoder system in which an absolute encoder, for detecting the position after displacement of a motor, is operated intermittently using clock pulses when a backup battery needs to be used on an occasion of power failure or the like (see Japanese Laid-Open Patent Publication No. 2013-007696).

SUMMARY OF THE INVENTION

The internal devices of an absolute encoder may change in characteristics depending on the temperature thereof and the voltage of the battery. In detail, when the battery voltage or the temperature decreases, the devices inside the absolute encoder may take time to start output therefrom. Therefore, the pulse width of the clock pulse for operating the absolute encoder may be set wide. However, this causes a problem that the power consumption of the battery cannot be reduced.

It is therefore an object of the present invention to provide an absolute encoder that can reduce battery power consumption.

According to an aspect of the present invention, an absolute encoder configured to be driven by backup power from an external battery for backup includes: a clock generator configured to generate backup clock pulses at intervals of a predetermined period when the backup power is supplied; an analog signal generation circuit configured to operate according to the clock pulse so as to detect a displacement position of a motor and generate an analog signal corresponding to the detected displacement position; a comparator configured to operate according to the clock pulse so as to compare the analog signal with a predetermined voltage; and a clock control circuit configured to control the clock generator to change the pulse width of the clock pulse.

According to the present invention, it is possible to reduce the power consumption of the battery.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An absolute encoder according to the present invention will be detailed below by describing a preferred embodiment with reference to the accompanying drawings.

Embodiment

Figure 1:
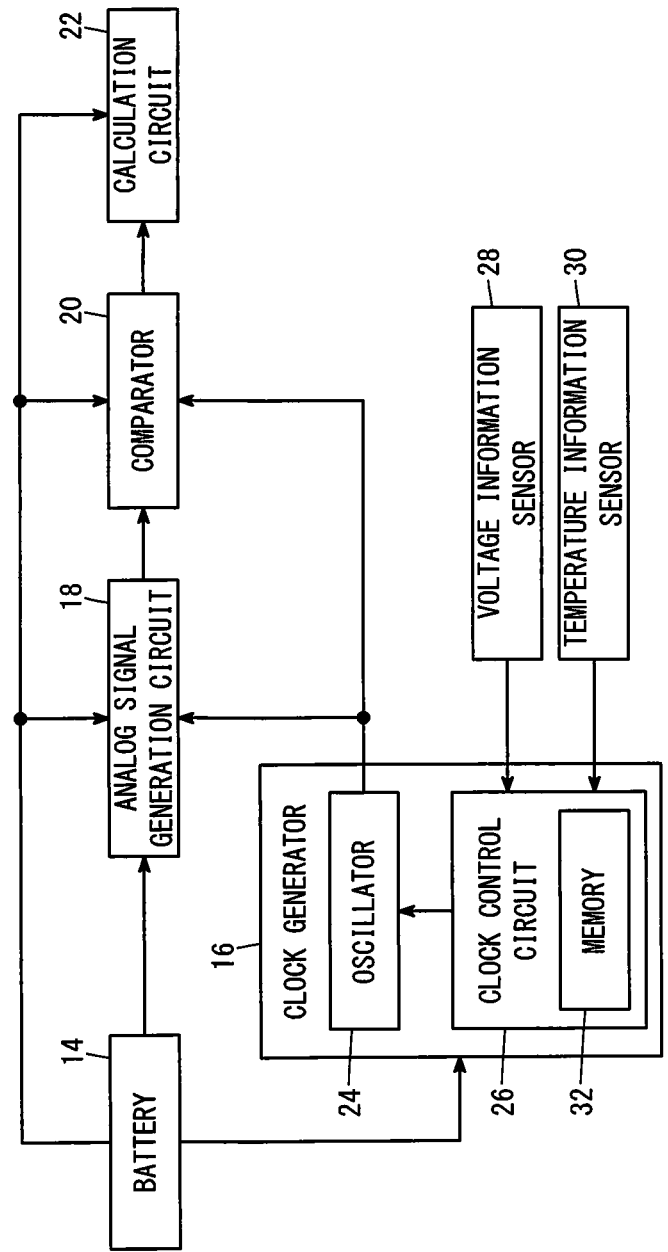
FIG. 1 is a diagram illustrating a configuration of an encoder according to an embodiment of the present invention.

FIG. 1 is a diagram illustrating the configuration of an absolute encoder 10 according to the present embodiment. Hereinafter, the absolute encoder 10 is also referred to as the encoder 10. The encoder 10 may be an optical encoder or a magnetic encoder. The encoder 10 is supplied with electric power from an unillustrated main power supply to measure the displacement position of a motor. Here, the displacement position of the motor is a position after displacement or movement of the motor; for example, when the motor is a rotary motor, it means the rotational position of the motor. The present embodiment will be described below on the assumption that the motor is a rotary motor. Accordingly, the displacement position will be described below as the rotational position. However, the motor is not limited to the rotary motor, and may be a linear motor or the like.

When the main power supply is shut off, the encoder 10 operates by receiving power supply from an external backup battery 14 provided outside. The encoder 10 includes a clock generator 16, an analog signal generation circuit 18, a comparator 20, a calculation circuit 22, and the like.

When electric power for backup (also referred to as backup power) is supplied from the battery 14, the clock generator 16 generates a clock pulse for backup at a predetermined cycle and supplies the generated clock pulse to the analog signal generation circuit 18 and the comparator 20. The clock generator 16 includes an oscillator 24 and a clock control circuit 26.

The oscillator 24 generates a clock pulse. The clock control circuit 26 controls the oscillator 24 to change the pulse width of the clock pulse to be generated by the oscillator 24. The clock control circuit 26 acquires at least one of the voltage of the battery 14 from a voltage information sensor 28 and the temperature of the encoder 10 from a temperature information sensor 30. Then, the clock control circuit 26 controls the oscillator 24 to change the pulse width of the clock pulse based on at least one of the voltage of the battery 14 and the temperature of the encoder 10.

The voltage information sensor 28 is a sensor that detects the voltage of the battery 14, and the temperature information sensor 30 is a sensor that detects the temperature of the encoder 10.

The clock control circuit 26 has a memory 32 storing correspondence information in which at least one of the temperature of the encoder 10 and the voltage of the battery 14 is associated with the pulse width. The correspondence information is, for example, information represented by a formula, a table or a graph.

Figure 2A:
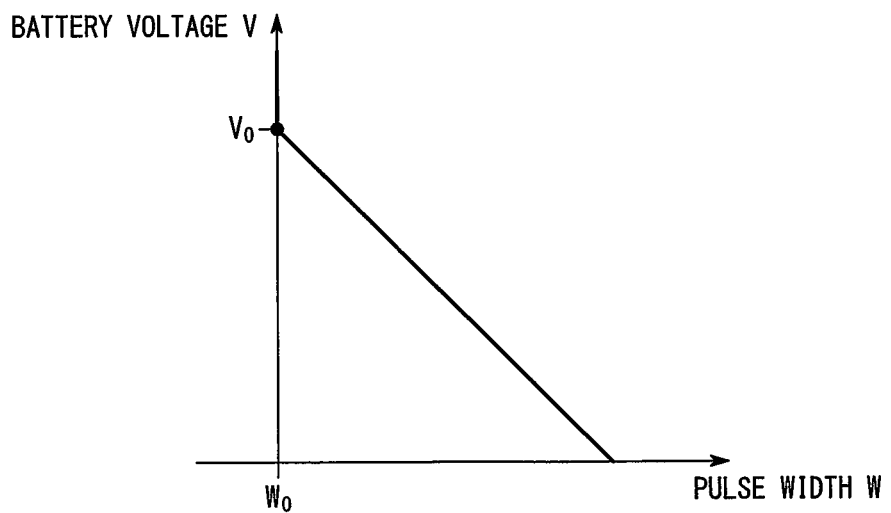
FIG. 2A is a chart showing an example of correspondence information between battery voltage and pulse width.

FIG. 2A is a chart showing an example of correspondence information in which the voltage V of the battery 14 is associated with the pulse width W. As shown in FIG. 2A, in the correspondence information, the higher the voltage V of the battery 14, the shorter the pulse width W. $V_0$ is a predetermined reference voltage, and in the correspondence information, when the voltage V is equal to or higher than the reference voltage $V_0$, the pulse width W takes a constant value ($W_0$).

Figure 2B:
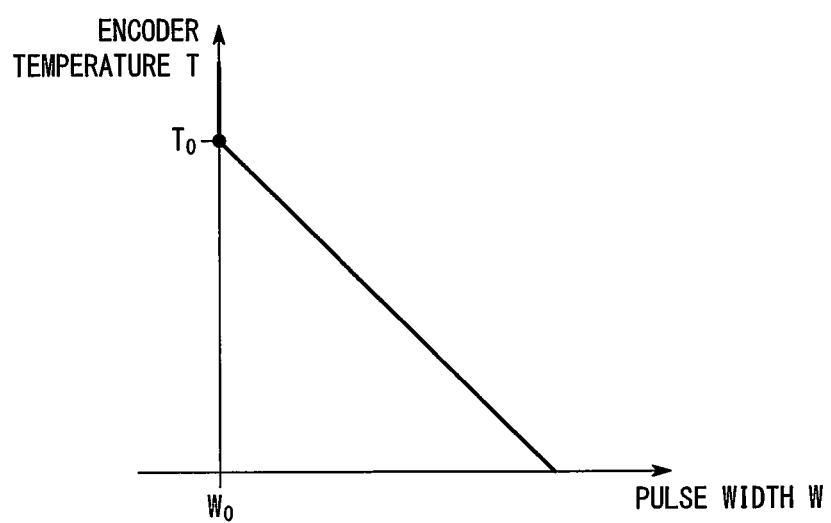
FIG. 2B is a chart showing an example of correspondence information between encoder temperature and pulse width.

FIG. 2B is a chart showing an example of correspondence information in which the temperature T of the encoder 10 is associated with the pulse width W. As shown in FIG. 2B, in the correspondence information, the higher the temperature T of the encoder 10, the shorter the pulse width W. $T_0$ is a predetermined reference temperature. In the correspondence information, when the temperature T is equal to or higher than the reference temperature $T_0$, the pulse width W takes a constant value ($W_0$).

The correspondence information illustrated in FIG. 2A gives a case where the voltage V of the battery 14 and the pulse width W have a linear relationship, but the relationship between the voltage V and the pulse width W in the correspondence information is not limited to this. The correspondence information illustrated in FIG. 2B gives a case where the temperature T of the encoder 10 and the pulse width W have a linear relationship, but the relationship between the temperature T and the pulse width W in the correspondence information is not limited to this. In the correspondence information, the relation between the voltage V and the pulse width W may be represented by, for example, a curve or multiple points. Further, in the correspondence information, the relation between the temperature T and the pulse width W may be represented by a curve or multiple points.

Other than those illustrated in FIGS. 2A and 2B, the correspondence information may be given by associating both the voltage V and the temperature T with, and the pulse width W. For example, in such correspondence information, when the voltage V is multiplied by α and the temperature T is multiplied by β, the pulse width W may be given by that multiplication (α×β).

The clock control circuit 26 uses the correspondence information stored in the memory 32 to determine the pulse width W of the clock pulse. The reason for the pulse width W being changed using at least one of the temperature T and the voltage V will be described later.

The analog signal generation circuit 18 receives supply of power from the battery 14 and operates in response to the clock pulse output from the clock generator 16. The analog signal generation circuit 18 detects the rotational position of the motor and generates analog signals of phase A and phase B corresponding to the detected rotational position.

The comparator 20 compares the voltage of the analog signals generated by the analog signal generation circuit 18 with a predetermined voltage. Then, the comparator 20 generates an output signal of a square wave in which a portion higher than the predetermined voltage is High and a portion lower than the predetermined voltage is Low for each of the phase A and the phase B analog signals.

The calculation circuit 22 calculates the rotational position of the motor using the output signals generated by the comparator 20.

It should be noted herein that the analog signal generation circuit 18 requires a certain amount of time (first period) to start output after input of the clock pulse. The comparator 20 also requires a certain amount of time (second period) to start output after input of the clock pulse. The first period and the second period change depending on the voltage V of the battery 14 and the temperature T of the encoder 10. That is, the lower the voltage V, the longer the first period and the second period. In addition, the lower the temperature T, the longer the first period and the second period.

Therefore, when the first period is short and the second period is long, the time from when the clock pulse is input to the analog signal generation circuit 18 and the comparator 20 to when the comparator 20 starts to output the output signal (hereinafter, also referred to as the pre-activation time) corresponds to the second period. Conversely, when the first period is long and the second period is short, the pre-activation time corresponds to the first period. That is, the pre-activation time from when the clock pulse is input to the analog signal generation circuit 18 and the comparator 20 to when the comparator 20 starts to output the output signal becomes longer as the voltage V is lower and as the temperature T is lower.

Figure 3A:
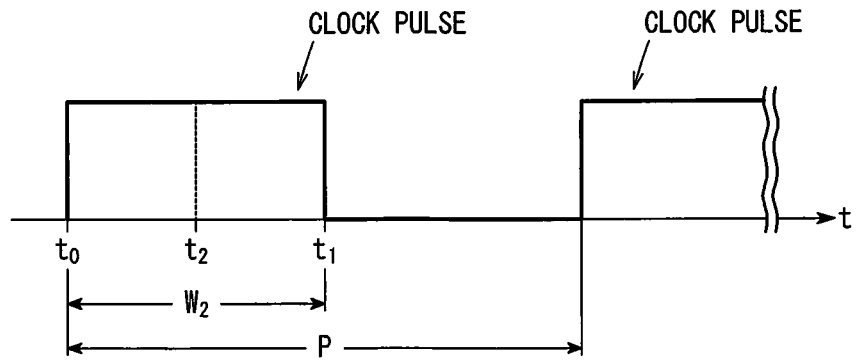
FIGS. 3A, 3B and 3C are diagrams illustrating pre-activation time when the voltage is high and low with the pulse width of the clock pulse fixed.
Figure 3B:
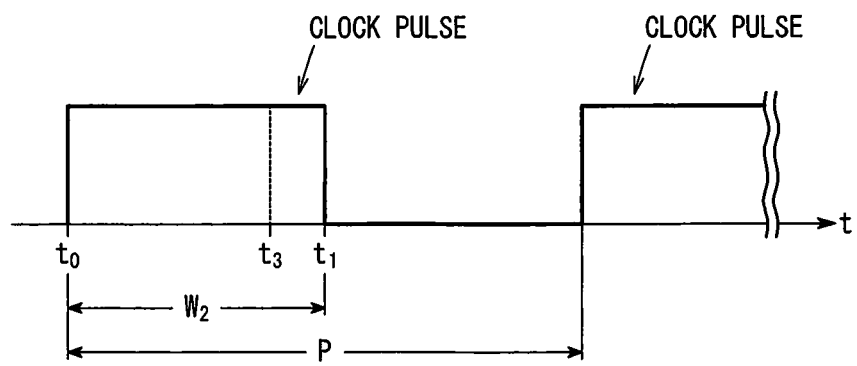
Figure 3C:
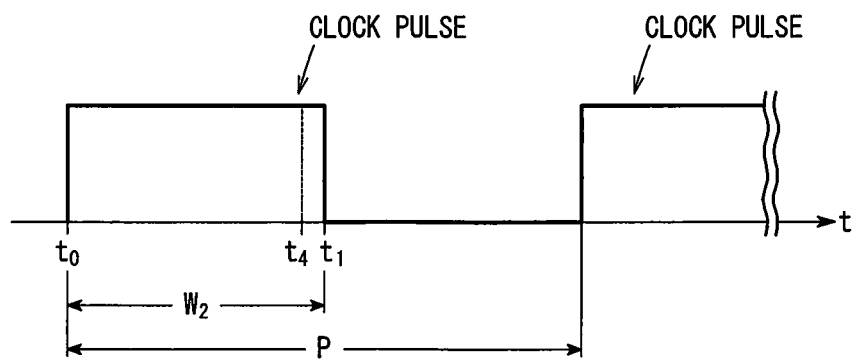

Therefore, the pulse width W of the clock pulse is increased in the conventional practice, by assuming that the temperature T and the voltage V are low. FIGS. 3A to 3C are diagrams illustrating the pre-activation time when the voltage V is high and low when the pulse width W of the clock pulse is fixed. FIG. 3A shows the pre-activation time when the voltage V is higher than a reference voltage $V_0$, FIG. 3B shows the pre-activation time when the voltage V is lower than the reference voltage $V_0$, and FIG. 3C shows the pre-activation time when the voltage V is lower than that in FIG. 3B. Here, in FIGS. 3A, 3B and 3C, it is assumed that the temperatures T of the encoders 10 are the same.

The correspondence information is information which associates at least one of the voltage V of the battery 14 and the temperature T of the encoder 10 with an appropriate pulse width W based on the pre-activation time. The appropriate pulse width W based on the pre-activation time is a pulse width W covering the pre-activation time, and is determined beforehand based on the pre-activation time. The appropriate pulse width W may be, for example, the pulse width W corresponding to the pre-activation time.

In FIGS. 3A, 3B and 3C, the clock pulse rises at time $t_0$ and falls at time $t_1$. In this case, the pulse width W is $W_2$ ($W_2 = t_1 - t_0$). The clock pulse is output to the comparator 20 and the like at intervals of a constant period P. The period P is equal to or longer than $W_2$.

In FIG. 3A, the output start point of the comparator 20 is time $t_2$. In FIG. 3B, the output start point of the comparator 20 is time $t_3$, which is a point of time after time $t_2$. In FIG. 3C, the output start point of the comparator 20 is time $t_4$, which is a point of time after time $t_3$ and is close to time $t_1$ at which the clock pulse falls. Hereinafter, the output start point means a point of time at which the comparator 20 starts output.

In the case of FIG. 3A where the voltage V is the highest, the pre-activation time ($t_2 - t_0$) is the shortest. In the case of FIG. 3C where the voltage V is the lowest, the pre-activation time ($t_4 - t_0$) is the longest. Thus, as the voltage V is higher, the pre-activation time becomes shorter. Therefore, as the voltage V is higher, the time from the output start time to the clock fall time $t_1$ becomes longer. Similarly, the higher the temperature T, the shorter the pre-activation time, and the longer the time from the output start time to the clock fall time $t_1$. The comparator 20 and the like perform processing according to the rotational motion of the motor from the output start time to the clock fall time $t_1$ and continue consuming power from the battery 14. In contrast, according to the encoder 10 that changes the pulse width W using the above-described correspondence information, power consumption can be reduced.

Figure 4A:
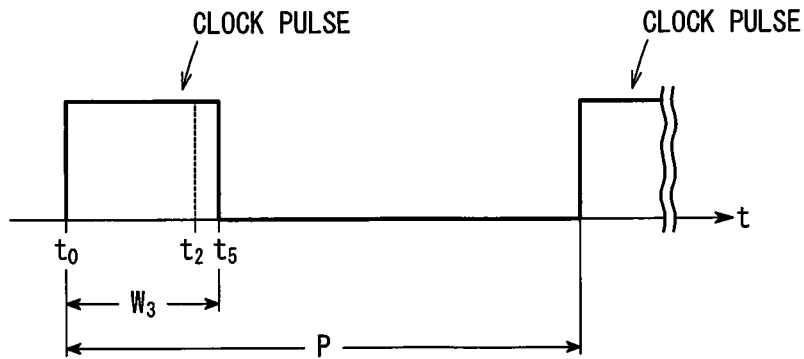
FIGS. 4A, 4B and 4C are diagrams illustrating the pulse width changed based on the correspondence information in this embodiment.
Figure 4B:
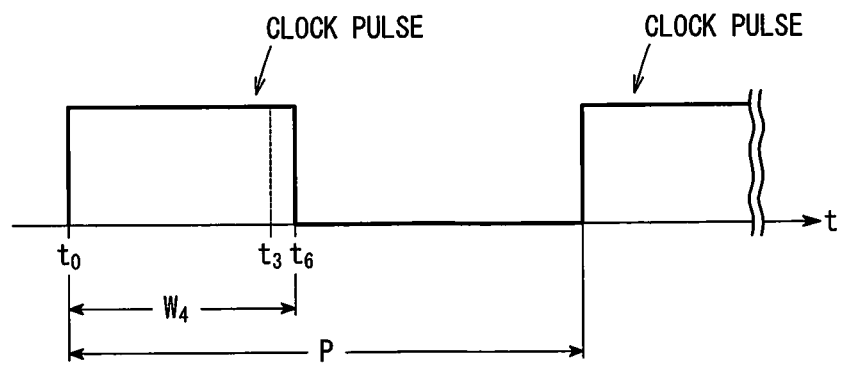
Figure 4C:
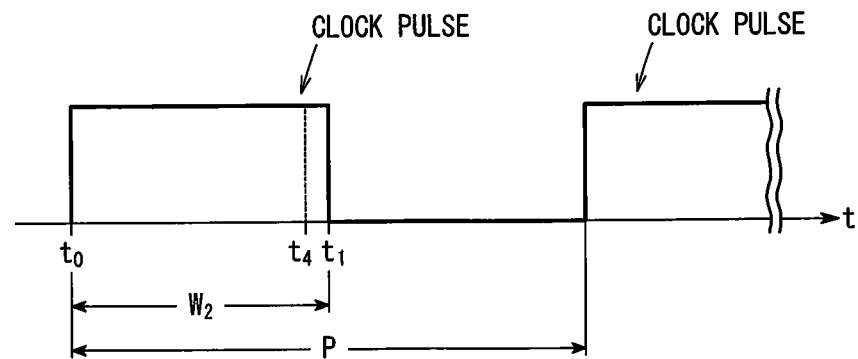

Referring next to FIGS. 4A, 4B, and 4C, description will be given on how the clock control circuit 26 of the present embodiment changes the pulse width W using the correspondence information when the voltage V of the battery 14 takes different values. FIGS. 4A, 4B, and 4C are diagrams illustrating the pulse width W changed based on the correspondence information in the present embodiment. The voltages V in FIGS. 4A, 4B and 4C are equal to the voltages V in FIGS. 3A, 3B, and 3C, respectively. Also, the temperatures T in FIGS. 4A, 4B and 4C are equal to the temperatures T in FIGS. 3A, 3B and 3C, respectively. Under these conditions, in FIG. 4A, the output start point is time $t_2$ as in the case shown in FIG. 3A. In FIG. 4B, the output start point is time $t_3$ as in the case shown in FIG. 3B. In FIG. 4C, the output start point is time $t_4$ as in the case shown in FIG. 3C.

In FIG. 4A, the pulse width W contains the pre-activation time $(t_2-t_0)$ but is changed to $W_3$ ($W_3=t_5-t_0$), which is shorter than $W_2$. Accordingly, the clock pulse rises at time $t_0$ and falls at time $t_5$, which is earlier than time $t_1$.

In FIG. 4B, the pulse width W contains the pre-activation time $(t_3-t_0)$ and is changed to $W_4$ ($W_4=t_6-t_0$), which is shorter than $W_2$. Accordingly, the clock pulse rises at time $t_0$ and falls at time $t_6$, which is earlier than time $t_1$.

In FIG. 4C, the output start point is time $t_4$, which is close to time $t_1$, and the pre-activation time approximates to $W_2$, the pulse width W is not changed and remains $W_2$.

Thus, the clock control circuit 26 changes the pulse width W in accordance with the pre-activation time that varies depending on the voltage V. The pre-activation time also varies with the temperature T. The clock control circuit 26 changes the pulse width W in accordance with the pre-activation time that varies depending on the temperature T.

Figure 5:
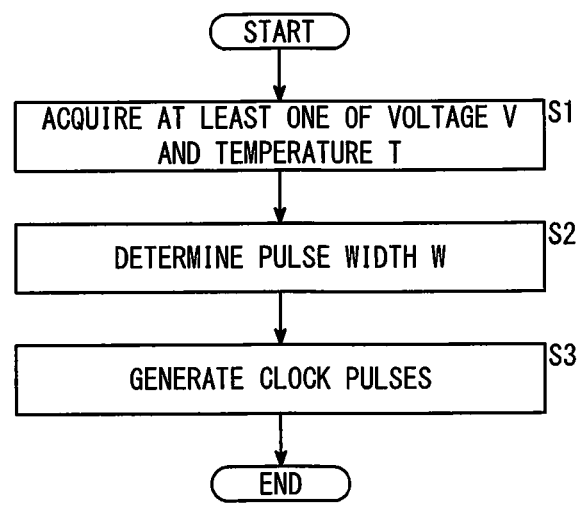
FIG. 5 is a flowchart illustrating the process of a clock generator.

The flow of the process by the clock generator 16 will be described hereinbelow. FIG. 5 is a flowchart illustrating the process of the clock generator 16. The clock control circuit 26 acquires at least one of the voltage V from the voltage information sensor 28 and the temperature T from the temperature information sensor 30 (step S1). The clock control circuit 26 acquires from the correspondence information the pulse width W corresponding to at least one of the voltage V and the temperature T acquired at step S1, and determines the acquired pulse width W as the pulse width W of the clock pulse to be oscillated by the oscillator 24 (step S2). The clock control circuit 26 controls the oscillator 24 to thereby generate clock pulses of the determined pulse width W. The oscillator 24 outputs the clock pulses having the pulse width W determined by the clock control circuit 26 to the analog signal generation circuit 18 and the comparator 20 (step S3).

The clock control circuit 26 in the present embodiment can be given by a hardware configuration including a processor such as a central processing unit (CPU) or a micro processing unit (MPU), a memory such as a random access memory (RAM) or a read only memory (ROM), a device driver for controlling the oscillator 24, an interface circuit for acquiring necessary information from the voltage information sensor 28 and the temperature information sensor 30, etc. The memory can store correspondence information. The processor, by executing the program stored in the memory using the information on the voltage V and the temperature T acquired via the interface circuit and the correspondence information, can achieve a function for determining the appropriate pulse width W according to the voltage V and the temperature T. Also, the processor, by controlling the oscillator 24 via the device driver, can achieve a function for changing the pulse width W to be output from the oscillator 24. It should be noted that the hardware configuration of the clock control circuit 26 is not limited to the above.

The encoder 10 according to the present embodiment can generate a clock pulse having an appropriate pulse width W in conformity with the pre-activation time. Thereby, when the pre-activation time is short, the pulse width W can be shortened to suppress the power consumption of the battery 14.

Further, the voltage V and the temperature T change with every moment and the pre-activation time changes accordingly. The clock control circuit 26 in the present embodiment determines the pulse width W based on at least one of the voltage V and the temperature T, instead of the pre-activation time. Therefore, compared to the case where the pulse width W is determined using the pre-activation time itself, the configuration can be simplified without needing any feedback circuit or the like. In addition, when the pulse width W is changed using the pre-activation time, the voltage V etc., may change at the time of the next output. However, in this embodiment, use of the voltage information sensor 28 or the like to acquire the voltage V from moment to moment enables the clock control circuit 26 to quickly determine the appropriate pulse width W.

[Modifications]

In the above embodiment, the temperature information sensor 30 is used to detect the temperature T of the encoder 10, but may be used to detect information indicating temperature, instead of the temperature T of the encoder 10. The information indicating temperature may be, for example, the magnitude of electric current flowing through the clock generator 16, the analog signal generation circuit 18, the comparator 20, or the like, and the clock control circuit 26 may be configured to estimate the temperature T of the encoder 10 from the magnitude of this current. In this case, a circuit in which a resistance is not set may be provided inside the clock control circuit 26 or the like, and the temperature information sensor 30 may be configured to detect the current and the voltage across the resistance. Then, the clock control circuit 26 may calculate the resistance from the current and the voltage detected by the temperature information sensor 30 to thereby obtain the temperature T. In addition to the above, the information indicating the temperature includes, for example, the forward voltage of a diode provided inside the encoder 10, that is, may include any information whose amount of change with respect to temperature T is already known.

As described above, the configuration of the encoder 10 can be further simplified by using information indicating temperature, instead of the temperature T itself.

[Technical Ideas Obtained from Embodiment]

The technical ideas that can be grasped from the above embodiment will be described below.

The absolute encoder (10) configured to be driven by backup power from an external battery (14) for backup includes: a clock generator (16) configured to generate backup clock pulses at intervals of a predetermined period (P) when the backup power is supplied; an analog signal generation circuit (18) configured to operate according to the clock pulse so as to detect a displacement position of a motor and generate an analog signal corresponding to the detected displacement position; a comparator (20) configured to operate according to the clock pulse so as to compare the analog signal with a predetermined voltage; and a clock control circuit (26) configured to control the clock generator (16) to change the pulse width (W) of the clock pulse.

Thereby, the power consumption of the battery (14) can be reduced.

The clock control circuit (26) in the absolute encoder (10) may be configured to change the pulse width (W) of the clock pulse based on at least one of the voltage (V) of the external battery (14) and the temperature (T) of the absolute encoder (10). This configuration makes it possible to generate a clock pulse having an appropriate pulse width (W) in conformity with the pre-activation time which changes depending on the temperature (T) of the absolute encoder (10) and the voltage (V) of the battery (14).

The clock control circuit (26) in the absolute encoder (10) may have correspondence information indicating a relationship between at least one of the voltage (V) and the temperature (T) and the pulse width (W) and be configured to use the correspondence information to change the pulse width (W) of the clock pulse. This eliminates the need to determine an appropriate pulse width (W) every time the encoder (10) is operated, and it is possible to quickly change the pulse width (W) appropriately, thereby making it possible to reduce the processing load of the encoder (10).

The clock control circuit (26) in the absolute encoder (10) may be configured to lengthen the pulse width (W) of the clock pulse as the voltage (V) becomes lower and lengthen the pulse width (W) of the clock pulse as the temperature (T) becomes lower. With this configuration, it is possible to shorten the pulse width (W) when the pre-activation time is short and lengthen the pulse width (W) when the pre-activation time is long, so that it is possible to suppress the power consumption of the battery (14) while obtaining the required output result.

The clock control circuit (26) in the absolute encoder (10) may be configured to obtain at least one of the voltage (V) from a voltage information sensor (28) configured to detect information indicating the voltage (V) and the temperature (T) from a temperature information sensor (30) configured to detect information indicating the temperature (T). This configuration makes it possible to change the pulse width (W) quickly and appropriately in conformity with the voltage (V) and temperature (T), which change with every moment.

The pulse width (W) of the clock pulse determined by the absolute encoder (10) may be equal to or longer than the time from when the clock pulse is input to the analog signal generation circuit (18) and the comparator (20) to when the comparator (20) starts to output an output signal corresponding to the displacement position. This enables the comparator (20) to output using the analog signal generated by the analog signal generation circuit (18).

The absolute encoder (10) may further include a calculation circuit (22) configured to calculate the displacement position based on an output signal from the comparator (20). Thus, it is possible to obtain the displacement position of the motor.

While the invention has been particularly shown and described with reference to the preferred embodiments, it will be understood that variations and modifications can be effected thereto by those skilled in the art without departing from the scope of the invention as defined by the appended claims.

What is claimed is:

1. An absolute encoder configured to be driven by backup power from an external battery for backup, comprising:
    a clock generator configured to generate backup clock pulses at intervals of a predetermined period when the backup power is supplied;
    an analog signal generation circuit configured to operate according to each clock pulse so as to detect a displacement position of a motor and generate an analog signal corresponding to the detected displacement position;
    a comparator configured to operate according to the clock pulse so as to compare the analog signal with a predetermined voltage; and
    a clock control circuit configured to control the clock generator to change a pulse width of the clock pulse.

2. The absolute encoder according to claim 1, wherein the clock control circuit is configured to change the pulse width of the clock pulse based on at least one of a voltage of the external battery and a temperature of the absolute encoder.

3. The absolute encoder according to claim 2, wherein the clock control circuit has correspondence information indicating a relationship between at least one of the voltage and the temperature and the pulse width and is configured to use the correspondence information to change the pulse width of the clock pulse.

4. The absolute encoder according to claim 2, wherein the clock control circuit is configured to lengthen the pulse width of the clock pulse as the voltage becomes lower and lengthen the pulse width of the clock pulse as the temperature becomes lower.

5. The absolute encoder according to claim 2, wherein the clock control circuit is configured to obtain at least one of the voltage from a voltage information sensor configured to detect information indicating the voltage and the temperature from a temperature information sensor configured to detect information indicating the temperature.

6. The absolute encoder according to claim 1, wherein the pulse width of the clock pulse is equal to or longer than a time from when the clock pulse is input to the analog signal generation circuit and the comparator to when the comparator starts to output an output signal corresponding to the displacement position.

7. The absolute encoder according to claim 1, further comprising a calculation circuit configured to calculate the displacement position based on an output signal from the comparator.

* * * * *